(12) United States Patent
Elsayed et al.

(10) Patent No.: US 12,533,628 B2
(45) Date of Patent: Jan. 27, 2026

(54) SYSTEM AND METHOD FOR PRESSURIZED DIRECT AIR CAPTURE OF CARBON DIOXIDE

(71) Applicants: Ahmed Mohamed Nasereidin Mohamed Elsayed, Al Ain (AE); Thaier Tawfeek Alawadh, Al Khobar (SA)

(72) Inventors: Ahmed Mohamed Nasereidin Mohamed Elsayed, Al Ain (AE); Thaier Tawfeek Alawadh, Al Khobar (SA)

(73) Assignee: Ahmed Mohamed Nasereidin Mohamed Elsayed (AE)

(*) Notice: Subject to any disclaimer, the term of this patent is extended or adjusted under 35 U.S.C. 154(b) by 0 days.

(21) Appl. No.: 18/955,610

(22) Filed: Nov. 21, 2024

(65) Prior Publication Data

US 2025/0170520 A1    May 29, 2025

Related U.S. Application Data

(60) Provisional application No. 63/603,102, filed on Nov. 27, 2023.

(51) Int. Cl.
| | | |
|---|---|---|
| *B01D 53/14* | (2006.01) | |
| *B01D 51/10* | (2006.01) | |
| *B01D 53/18* | (2006.01) | |
| *B01D 53/22* | (2006.01) | |
| *F01D 15/08* | (2006.01) | |

(52) U.S. Cl.
CPC ......... *B01D 53/1475* (2013.01); *B01D 51/10* (2013.01); *B01D 53/1425* (2013.01); *B01D 53/18* (2013.01); *B01D 53/229* (2013.01); *F01D 15/08* (2013.01); *B01D 2257/504* (2013.01); *F05D 2220/62* (2013.01)

(58) Field of Classification Search
CPC ................ B01D 53/1475; B01D 51/10; B01D 53/1425; B01D 53/18; B01D 53/229; B01D 2257/504; F01D 15/08; F01D 2220/62
See application file for complete search history.

(56) References Cited

U.S. PATENT DOCUMENTS

| | | | | |
|---|---|---|---|---|
| 3,870,495 | A * | 3/1975 | Dixson ............... | B01D 46/2411 55/497 |
| 6,416,568 | B1 * | 7/2002 | Wallace ................. | C01B 3/501 95/55 |
| 6,736,238 | B2 * | 5/2004 | Kerr ...................... | F04D 29/663 181/269 |
| 2002/0073659 | A1 * | 6/2002 | Anderson ............. | B65B 31/042 53/510 |
| 2005/0169825 | A1 * | 8/2005 | Cadours ............. | B01D 53/1425 423/220 |

(Continued)

Primary Examiner — Jennifer Dieterle
Assistant Examiner — Phillip Y Shao
(74) Attorney, Agent, or Firm — C. Tumey Law Group PLLC

(57) ABSTRACT

A high-pressure direct air capture (DAC) system for dilute carbon dioxide streams includes a compressor configured to compress an air stream comprising carbon dioxide to form a compressed air stream; and a gas separation system coupled to the compressed air stream, wherein the gas separation system is configured to remove at least a portion of the carbon dioxide from the compressed air stream to form a stream with reduced carbon content.

13 Claims, 5 Drawing Sheets

(56) References Cited

U.S. PATENT DOCUMENTS

| | | | | |
|---|---|---|---|---|
| 2011/0107916 A1* | 5/2011 | Inoue | B01D 53/1475 | 96/242 |
| 2011/0171105 A1* | 7/2011 | Sevier | B01D 53/62 | 423/430 |
| 2011/0203314 A1* | 8/2011 | Mak | B01D 53/1475 | 96/242 |
| 2011/0239700 A1* | 10/2011 | Hasse | F23J 15/06 | 62/617 |
| 2012/0009114 A1* | 1/2012 | Chen | B01D 53/1425 | 423/437.1 |
| 2013/0095016 A1* | 4/2013 | Miyagawa | B01D 53/62 | 423/220 |
| 2014/0056687 A1* | 2/2014 | Younes | F04D 27/00 | 415/1 |
| 2014/0128656 A1* | 5/2014 | Arluck | C07C 7/11 | 422/111 |
| 2014/0190351 A1* | 7/2014 | Reddy | B01D 53/1475 | 96/202 |
| 2017/0354925 A1* | 12/2017 | Heidel | F28F 25/06 | |
| 2018/0243688 A1* | 8/2018 | Hamrin | B01D 53/78 | |
| 2019/0143260 A1* | 5/2019 | Novek | B01D 53/1487 | 95/206 |

* cited by examiner

SYSTEM AND METHOD FOR PRESSURIZED DIRECT AIR CAPTURE OF CARBON DIOXIDE

CROSS-REFERENCE TO RELATED APPLICATIONS

This application is a non-provisional application which claims priority to U.S. Provisional Application 63/603,102 filed Nov. 27, 2023, the disclosure of which is incorporated by reference in its entirety.

FIELD

This disclosure relates to a direct air capture (DAC) of carbon dioxide, and more particularly to a high-pressure DAC system designed to separate carbon dioxide.

BACKGROUND

Carbon dioxide capture, or simply carbon capture, is a process which removes carbon dioxide ($CO_2$) from various gas streams. A common application of carbon capture is to remove $CO_2$ from natural gas and post-combustion streams at power plants. Direct Air Capture (DAC) is a specific form of carbon capture technology that involves capturing $CO_2$ directly from the atmosphere, rather than from industrial or power plant sources. This makes DAC a promising technology for mitigating climate change, as it has the potential to remove $CO_2$ from the atmosphere.

However, capturing carbon dioxide from dilute carbon dioxide streams can be challenging, as the concentration of $CO_2$ in the gas stream may be extremely low, which makes it more expensive to capture. To overcome this challenge, various methods have been proposed for capturing $CO_2$ from dilute gas streams, such as gas absorption, gas adsorption, gas membranes, and electrochemical methods, among others. Unfortunately, current methods are not optimized for capturing $CO_2$ from dilute gas streams and are often inefficient and costly.

Some low-pressure direct air capture systems use large industrial fans to capture $CO_2$ at or near atmospheric pressure. Since the concentration of $CO_2$ in the air is low, $CO_2$ capturing methods which operate at atmospheric pressure may require large amounts of energy to capture $CO_2$. Additionally, these methods have relatively slow $CO_2$ sorption rates and lower $CO_2$ sorption capacity and may require larger sorption contact area. Sorption refers to both adsorption and absorption.

At the heart of conventional low-pressure DAC, or atmospheric DAC systems is a contact structure or "contactor", configured for $CO_2$ sorption. A noticeable feature of these systems is that they often contain large fans which are integral to their design and operation. These fans draw in ambient air and channel the air to the contactor where a portion of the carbon dioxide is removed from the air. The contactor includes a $CO_2$ capture medium such as liquid absorption with a strong base such as Group I or Group II hydroxides and/or solid adsorption with weak bases such as an amine-based material. In some embodiments, the $CO_2$ capture medium includes a metal hydroxide such as potassium hydroxide (KOH) or other solvents which effectively trap the $CO_2$ molecules. The prevailing approach to scaling DAC technology has been to increase the number of fans, operating under the principle that more fans would lead to greater air processing capacity and, consequently, higher $CO_2$ capture rates. However, this strategy alone is insufficient for achieving $CO_2$ removal on a gigaton scale.

SUMMARY

The present disclosure includes, in some embodiments, a system for capturing $CO_2$ from dilute gas streams using an aqueous absorption method. The pressure of the diluted $CO_2$ gas stream is raised before being introduced to the aqueous solution.

The system is composed of several components, including absorption and stripping columns, aqueous pressure and pneumatic pressure equipment, and a heat recovery unit. The air intake subsystem is responsible for bringing in the air stream, and it is designed to remove certain particles and any drag from air flow layers. The air intake subsystem compresses the incoming air to high pressures and feeds it into the absorption column. The absorption column is the key component of the system, which takes in a lean aqueous solution from the top of the column and enriches it with $CO_2$ from the air as it goes down the column. The absorption column operates at high-pressures and relatively ambient temperatures, and the absorbent used can come from materials such as sodium carbonate, potassium carbonate, ammonia, or any combination of these.

In embodiments of the present disclosure, a gas separation system of the $CO_2$ capture system operates at high-pressure. For example, a gas separation system operates at pressures at a point in a range between 10 bar-300 bar. In some embodiments, a gas separation system includes an aqueous absorption component which operates at pressures at a point in a range between 10 bar-50 bar. In some embodiments, a gas separation system includes an aqueous absorption component which operates at pressures at a point in a range between 50 bar-80 bar. In some embodiments, a gas separation system includes a polymer separation membrane which operates at pressures at a point in a range between 50 bar-120 bar. In some embodiments, a gas separation system includes a metal separation membrane which operates at pressures at a point in a range between 100 bar-300 bar.

In some embodiments, a gas stream may pass through a compressor to raise the pressure of the gas. The high-pressure gas stream may be fed into an absorption column. The absorption column, also referred to as the absorber, draws $CO_2$ out of the inlet gas stream. Separation of $CO_2$ from gas streams with a low concentration of $CO_2$ can be made easier if the pressure of the gas stream is raised.

In some embodiments, the air with reduced $CO_2$-content coming out from the absorption column may be sent back to the air intake system, which acts as a turbo-compressor. The high-pressure air may depressurize in a turbine until it approaches one bar. The turbine can drive the compressor to compress even more incoming air. The $CO_2$-rich solution coming out of the absorption column may be sent to a pressure exchanger followed by a heat exchanger. A pressure exchanger can transfer pressure from the rich solution to the lean solution. A heat exchanger can transfer heat from the lean solution to the rich solution.

The rich solution may then be sent to the stripping column, which generally operates at high temperatures and low pressures. The stripping column can act as a distillation column, with a condenser and a reboiler, to remove evaporate $CO_2$ while condensing and dissolving other components. Finally, the air intake subsystem is composed of filters, standard three-layered air filters, followed by baffles that act as air silencers, and finally followed by ducts to remove any turbulence in the air feed. Overall, this system is designed to capture $CO_2$ efficiently and cost-effectively from dilute gas streams using aqueous absorption, and it has the potential to be used on a large scale.

The present DAC methods and systems are optimized for dilute gas streams, for example the atmosphere. In some embodiments, the system may compress incoming air to increase its density without a net increase in energy costs. Net energy costs may not increase because of the use of compressor and turbine energy transfer processes. The high-pressure DAC system is designed to be more efficient and cost-effective than existing methods, as it works efficiently with dilute gas streams.

This present disclosure includes a DAC system that is capable of treating large volumes of air for carbon dioxide removal. The absorption column operates at high pressures and moderately ambient temperature, while the stripping column operates at higher temperatures and moderately ambient pressure. The system employs turbo-compressors, pressure exchangers, and/or a heat exchangers as a form of energy/pressure recovery devices. The system uses a solvent solution mixture composed of ammonia, sodium carbonate, and potassium carbonate. Finally, the system utilizes an air intake filter system to ensure optimal air compression performance.

Some embodiments include the use of isobaric pressure exchangers to recover much of the energy required to pressurize incompressible fluids to very high pressures. This energy recovery makes the process of $CO_2$ capture more energy-efficient, which is a key consideration for any large-scale $CO_2$ capture system.

Some advancements in turbomachinery have also played a role in the development of the DAC process disclosed herein. The use of axial components instead of centrifugal compressors has led to more efficient gas turbines/engines. The innovation with air intake systems has allowed for the optimization of air quality for the gas turbines, which is necessary for their efficient operation.

These and other features and attributes of the disclosed methods and compositions of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
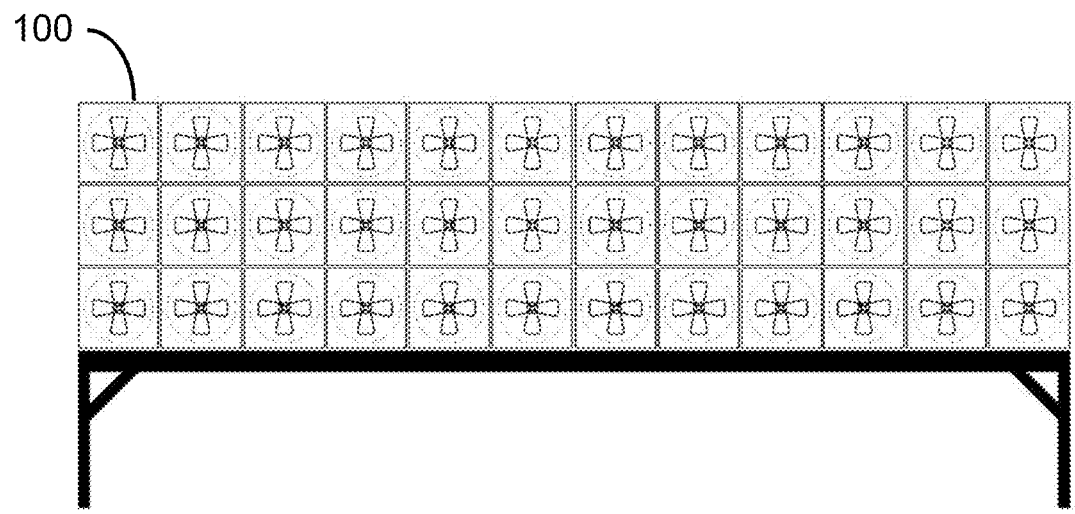
FIG. 1 illustrates an atmospheric direct air capture (DAC) in accordance with some embodiments of the present disclosure.

The present disclosure relates to direct air capture (DAC), and more particularly to high-pressure DAC methods and systems for removal of atmospheric carbon dioxide ($CO_2$). The high-pressure DAC methods and systems disclosed herein are scalable and efficient for gigaton level capture of dilute $CO_2$ from dilute gas streams including direct capture of atmospheric $CO_2$. In embodiments, the high-pressure DAC system includes a compressor and a gas separation system.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature.

Some embodiments of the high-pressure DAC system include a compressor fluidically coupled to a gas separation system comprising a contactor containing a solvent for absorption of $CO_2$, a significant improvement over the atmospheric methods which normally use a fan connected to a contactor. This disclosed compressor-based approach offers three primary benefits, among others. First, compressors are designed with multiple stages, each capable of moving increasingly larger volumes of air. This multi-stage mechanism allows for a more compact layout, reducing the spatial footprint required for the DAC fans. Furthermore, compressors excel in decreasing the volume of air being processed. This capability means that as the compression ratio rises, the size of the contactor can be substantially reduced, leading to a more streamlined system. Finally, compressors demonstrate a marked efficiency advantage in managing vast volumes of air. This makes them particularly suitable for applications such as DAC, where handling and processing large quantities of air is essential for effective $CO_2$ capture.

Utilizing a compressor allows for high-pressure operation and the incorporation of green solvents. These features bring key advantages, mentioned below, that are crucial for reaching gigaton-scale capturing capacity.

In some embodiments, the high-pressure DAC methods and systems include a compressor fluidically coupled to a gas separation system comprising a gas membrane. The gas membrane may substantially lower $CO_2$ operating capturing costs, as compared to solvent based methods, enhancing both the environmental and economic sustainability of the process.

A variety of $CO_2$ gas separation techniques can achieve enhanced efficiency when integrated with compressors. Gas absorption involves the physical or chemical absorption of $CO_2$ into a liquid solvent. In gas adsorption, $CO_2$ molecules adhere to the surface of a solid adsorbent material, with the adsorption being physical or chemical depending on the gas-adsorbent interaction. The membrane separation technique employs semi-permeable membranes that selectively permit $CO_2$ to pass through more readily than other gases. These membranes, which can be composed of diverse materials such as polymers and ceramics, function through mechanisms of size exclusion or selective diffusion.

FIG. 1 illustrates an atmospheric direct air capture (DAC) system in accordance with some embodiments of the present disclosure. The atmospheric DAC system operates at ambient pressure and includes a fan array 100 with an internal sorption system. The fan array is configured to draw in air and facilitate the movement of the air to contact the air with the internal sorption system. The internal sorption system can include a liquid absorption method or solid adsorbent to capture carbon dioxide from the air provided by fan array 100. The atmospheric DAC system has several drawbacks including that operating atmospheric pressure may require large amounts of energy to capture $CO_2$, atmospheric pressure slow $CO_2$ sorption rates and low $CO_2$ sorption capacity and may require larger sorption contact area.

Figure 2A:
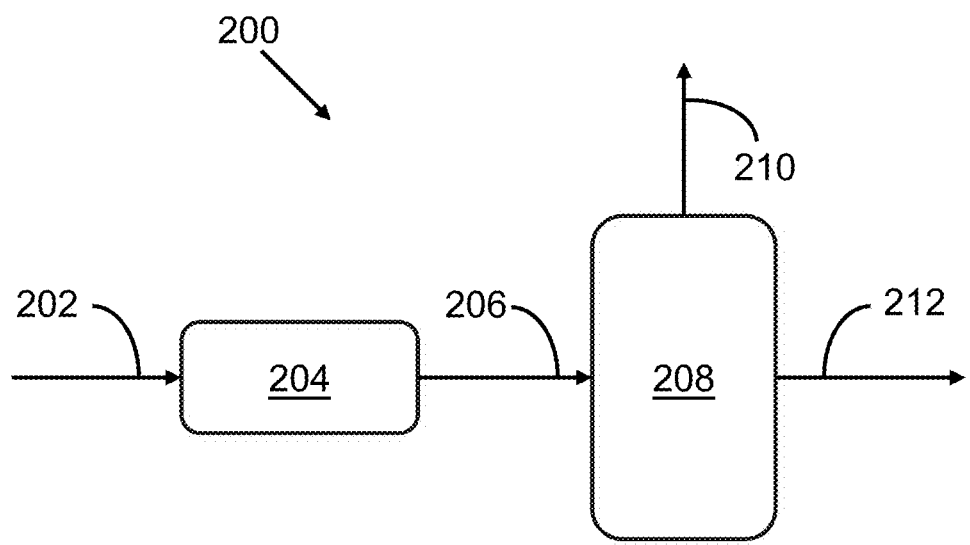
FIG. 2A illustrates an embodiment of a high-pressure DAC system in accordance with some embodiments of the present disclosure.

FIG. 2A illustrates an embodiment of a high-pressure DAC system 200. As illustrated in FIG. 2A, atmospheric air stream 202 is introduced into compressor 204 where the pressure of the atmospheric air stream 202 is raised to form compressed air stream 206. Compressed air stream 206 is introduced into gas separation system 208 where carbon dioxide from compressed air stream 206 is at least partially removed to produce air stream 212 with reduced carbon content and carbon rich stream 210. In embodiments, gas separation system 208 includes a contactor comprising a solvent and/or a gas membrane. In embodiments, air stream 212 with reduced carbon content is vented (purged) from high-pressure DAC system 200 and/or utilized in a downstream process. In embodiments, carbon rich stream 210 is directed towards an external compression unit, where it may be further processed for utilization, transport, or storage purposes. This could represent a typical process in carbon capture and storage (CCS) or in industries where separation of gases is required for various applications.

Figure 2B:
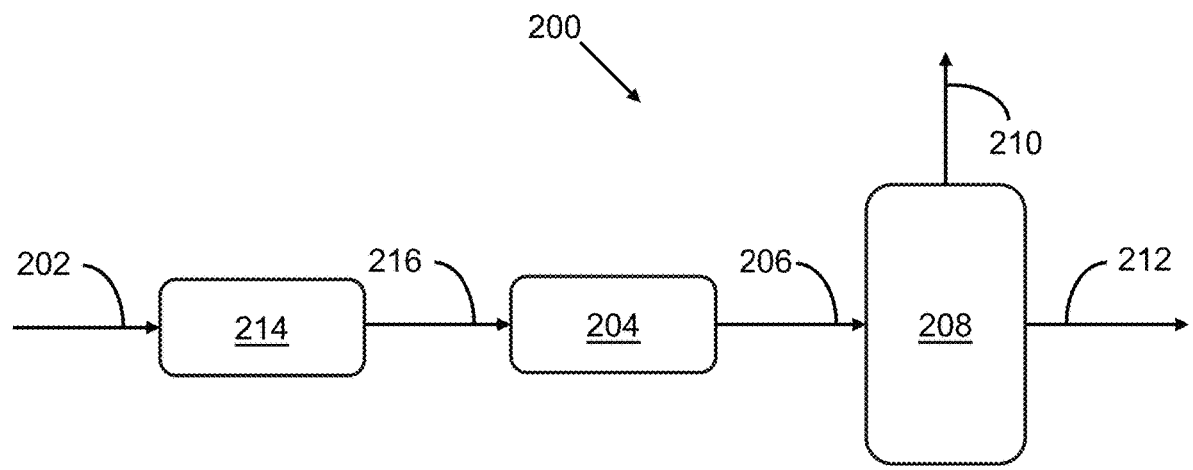
FIG. 2B illustrates an embodiment of a high-pressure DAC system comprising an air filtration system in accordance with some embodiments of the present disclosure.

FIG. 2B illustrates another embodiment of high-pressure DAC system 200 which includes the same components as high-pressure DAC system 200 from FIG. 2A with the addition of air intake filtration system 214. As shown in FIG. 2B, atmospheric air stream 202 is introduced into air intake filtration system 214 to produce cleaned air stream 216 which is introduced into compressor 204. Air intake filtration system 214 functions to remove impurities from atmospheric air stream 202 including, but not limited to such as: microorganisms, particulate matter, and water vapor.

The air intake filtration system 214 may be equipped with air filters, air silencers, and air ducts, for example. These components can help to ensure that clean air is drawn into the compressor 204 and that noise levels may be reduced. In embodiments, the air intake filtration system 214 includes an inlet duct as the first component of the air intake filtration system 214. The inlet duct is designed to capture the oncoming air and direct it towards an air filter. The inlet duct may further include an intake cone, which is used to streamline the air flow and improve efficiency. An air filter may be used to help remove contaminants from the incoming air. The filter may be made up of a series of screens and/or filter elements that capture any dust, dirt, or other particles in the air. The filter may be designed to meet specific efficiency requirements and can be replaced periodically to ensure optimal performance. Once the air has been filtered, it may be directed towards the compressor 204.

Further embodiments of air intake filtration system 214 include a drift eliminator which may be used to prevent water droplets from being carried into the compressor. The drift eliminator works by capturing the water droplets as they are carried by the exhaust air stream from a cooling tower or evaporative condenser system. In embodiments, air intake filtration system 214 further includes a plenum which fluidically connects the air intake system 214 to the compressor 204. The plenum is typically designed to minimize turbulence and improve airflow efficiency. In further embodiments, air intake filtration system 214 includes dampers and/or louvers for controlling the flow of air into the air intake filtration system 214. They may be used to adjust the amount of air flowing into high-pressure DAC system 200 based on the operating conditions of the compressor 204. In embodiments, one or more of air intake filtration system 214 and/or the plenum include expansion joints to accommodate thermal expansion and contraction of the air intake filtration system 214. The expansion joints are typically located at the joints between sections of the ductwork and can help to prevent damage to the system over time. The air intake filtration system 214 may provide a consistent flow of clean air to the compressor 204 while minimizing turbulence and maximizing efficiency.

Figure 3:
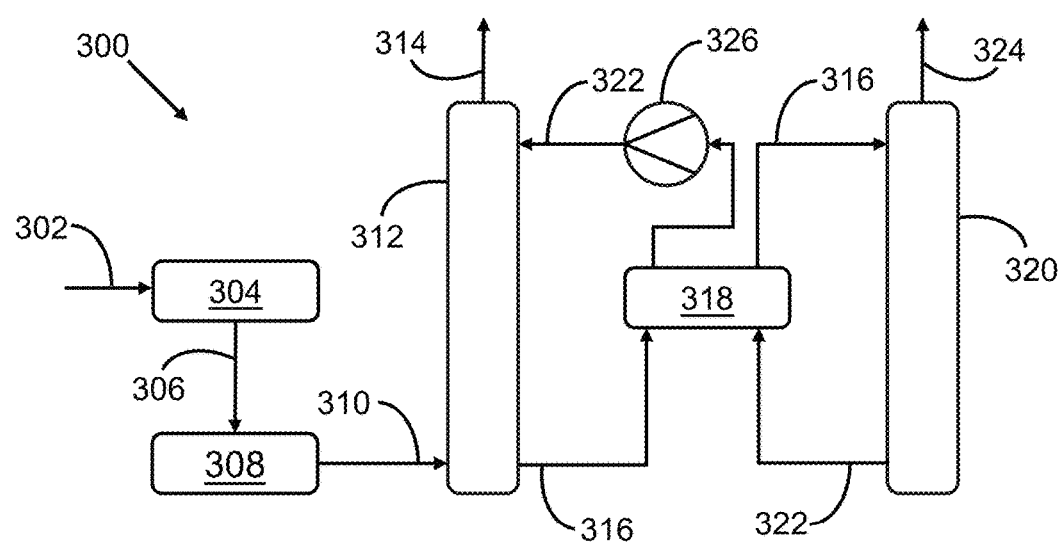
FIG. 3 illustrates an embodiment of a high-pressure DAC system comprising a heat exchanger in accordance with some embodiments of the present disclosure.

FIG. 3 illustrates another embodiment of a high-pressure DAC system 300. As shown in FIG. 3, atmospheric air stream 302 is introduced air intake filtration system 304. Air intake filtration system 304 can include an air intake filtration system as previously described. Cleaned air stream 306 is introduced into compressor 308 where the cleaned air stream is compressed to form compressed air stream 310 and thereafter introduced into pressurized absorption column 312. In pressurized absorption column 312, lean solvent stream 322 is contacted with the air from compressed air stream 310 and at least a portion of the carbon dioxide in the air is absorbed into the lean solvent. Air stream 314 with reduced carbon content is withdrawn from pressurized absorption column 312 and either purged from high-pressure DAC system 300 and/or utilized in a downstream process. Rich solvent stream 316 containing the absorbed carbon dioxide is withdrawn from pressurized absorption column 312, optionally flashed to a lower pressure, and introduced into heat exchanger 318. In heat exchanger 318, the relatively colder rich solvent stream 316 is thermally contacted with relatively warmer lean solvent stream 322 to transfer thermal energy and raise the temperature of the rich solvent stream before being withdrawn from heat exchanger 318 and introduced into stripping column 320. While described throughout herein as a stripping column, other methods for separating carbon dioxide from the rich solvent may be utilized such as an electrochemical cell. In stripping column 320, heat and optionally a stripping gas is utilized to strip the rich solvent of carbon dioxide to produce carbon rich stream 324 which may be sent for further processing and/or storage. Lean solvent stream 322 is withdrawn from stripping column 320 and introduced into heat exchanger 318 to heat rich solvent stream 316. The lean solvent stream 322 is withdrawn from heat exchanger 318 and introduced into pumping unit 326 to pressurize the solvent before introducing into pressurized absorption column 312.

Pressurized absorption column 312 operates at relatively higher pressure and relatively lower temperature than stripping column 320 which operates at a relatively lower pressure and relatively higher temperature. The addition of heat exchanger 318 in high-pressure DAC system 300 allows for recovery and reuse of thermal energy from the relatively warmer lean solvent stream 322 into the relatively cooler rich solvent stream 316 thereby reducing the energy requirement of the stripping column 320.

Figure 4:
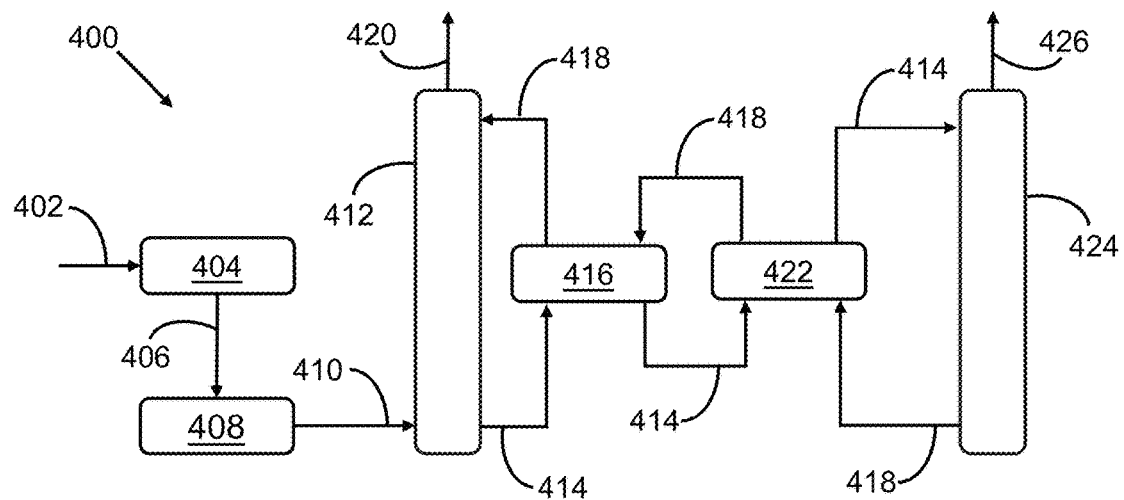
FIG. 4 illustrates an embodiment of a high-pressure DAC system comprising a heat exchanger and pressure exchanger in accordance with some embodiments of the present disclosure.

FIG. 4 illustrates another embodiment of a high-pressure DAC system 400. As shown in FIG. 4, atmospheric air stream 402 is introduced air intake filtration system 404. Air intake filtration system 404 can include an air intake filtration system as previously described. Cleaned air stream 406 is introduced into compressor 408 where the cleaned air stream is compressed to form compressed air stream 410 and thereafter introduced into pressurized absorption column 412. In pressurized absorption column 412, lean solvent stream 418 is contacted with the air from compressed air stream 410 and at least a portion of the carbon dioxide in the air is absorbed into the lean solvent. Air stream 420 with reduced carbon content is withdrawn from pressurized absorption column 412 and either purged from high-pressure DAC system 400 and/or utilized in a downstream process. Rich solvent stream 414 containing the absorbed carbon dioxide is withdrawn from pressurized absorption column 412 and introduced into pressure exchanger 416. Optionally, rich solvent stream 414 is flashed to a lower pressure prior to being introduced into pressure exchanger 416. In pressure exchanger 416, the relatively lower pressure lean solvent stream 418 is pressurized by exchanging pressure energy from relatively higher pressure rich solvent stream 414.

There are several types of pressure exchangers suitable for the present application of high-pressure DAC. One method connects a pump with a Francis turbine. When the high-pressure rich solvent stream enters the turbine, it causes the turbine blades to rotate, thus converting the fluid's kinetic energy into mechanical energy. This mechanical energy can then be transferred to a pump to pressurize lean solvent stream. In embodiments, pressure exchanger 416 may have an overall efficiency of 80% or greater. In some embodiments, pressure exchanger 416 includes an isobaric pressure exchanger which may have an efficiency of 95% or greater. Isobaric pressure exchangers may use a rotary mechanism that spins at high speeds to transfer pressure isobarically between fluids. The high-pressure fluid contacts the low-pressure fluid with minimal mixing, resulting in a relatively efficient energy transfer between the fluids. In the high-pressure DAC system embodiment, isobaric pressure exchangers may be used to improve energy efficiency in pumping solvent. Use of isobaric pressure exchangers may lower energy consumption, reduce costs, and improve environmental sustainability From pressure exchanger 416, the rich solvent stream 414 now at a lower pressure is introduced into heat exchanger 422. In heat exchanger 422, the relatively colder rich solvent stream 414 is thermally contacted with relatively warmer lean solvent stream 418 to raise the temperature of the rich solvent stream 414 before being withdrawn from heat exchanger 422 and introduced into stripping column 424. In stripping column 424, heat and optionally a stripping gas is utilized to strip the rich solvent of carbon dioxide to produce carbon rich stream 426 which may be sent for further processing and/or storage. Lean solvent stream 418 is withdrawn from stripping column 424 and introduced into heat exchanger 422 to heat rich solvent stream 414. The lean solvent stream 418 is withdrawn from heat exchanger 422 and introduced into pressure exchanger 416 to pressurize lean solvent stream 418.

Pressurized absorption column 412 operates at relatively higher pressure and relatively lower temperature than stripping column 424 which operates at a relatively lower pressure and relatively higher temperature. The addition of heat exchanger 422 and pressure exchanger 416 in high-pressure DAC system 400 allows for recovery and reuse of thermal energy from lean solvent stream 418 and pressure energy from rich solvent stream 414. Thereby reducing the heating energy requirement of the stripping column 424 and the pressurization energy requirements of the pressurized absorption column 412.

Figure 5:
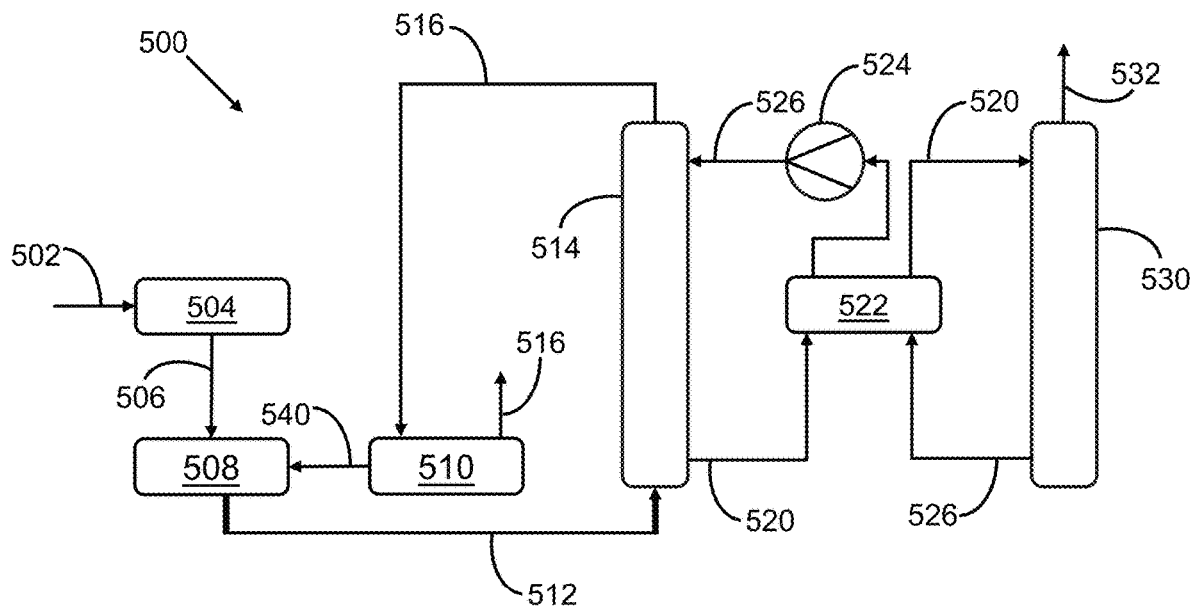
FIG. 5 illustrates an embodiment of a high-pressure DAC system comprising a heat exchanger and turbocompressor in accordance with some embodiments of the present disclosure.

FIG. 5 illustrates another embodiment of a high-pressure DAC system 500. As shown in FIG. 5, atmospheric air stream 502 is introduced air intake filtration system 504. Air intake filtration system 504 can include an air intake filtration system as previously described. Cleaned air stream 506 is introduced into compressor 508 where the cleaned air stream is compressed to form compressed air stream 512 which is thereafter introduced into pressurized absorption column 514. In pressurized absorption column 514, lean solvent stream 526 is contacted with the air from compressed air stream 512 and at least a portion of the carbon dioxide in the air is absorbed into the lean solvent. Air stream 516 with reduced carbon content is withdrawn from pressurized absorption column 514 and introduced into turbine 510 where the kinetic energy of the air in air stream 516 is converted to mechanical power 540 to drive compressor 508. The air stream 516 now at a lower pressure, may be either purged from high-pressure DAC system 500 and/or utilized in a downstream process.

Rich solvent stream 520 containing the absorbed carbon dioxide is withdrawn from pressurized absorption column 514, optionally flashed to a lower pressure, and introduced into heat exchanger 522. In heat exchanger 522, the relatively colder rich solvent stream 520 is thermally contacted with relatively warmer lean solvent stream 526 to raise the temperature of the rich solvent stream before being withdrawn from heat exchanger 522 and introduced into stripping column 530. In stripping column 530, heat and optionally a stripping gas is utilized to strip the rich solvent of carbon dioxide to produce carbon rich stream 532 which may be sent for further processing and/or storage. Lean solvent stream 526 is withdrawn from stripping column 530 and introduced into heat exchanger 522 to heat rich solvent stream 520. The lean solvent stream 526 is withdrawn from heat exchanger 522 and introduced into pumping unit 524 to pressurize the solvent before introducing into pressurized absorption column 514.

Pressurized absorption column 514 operates at relatively higher pressure and relatively lower temperature than stripping column 530 which operates at a relatively lower pressure and relatively higher temperature. The addition of heat exchanger 522 in high-pressure DAC system 500 allows for recovery and reuse of thermal energy from the relatively warmer lean solvent stream 526 into the relatively cooler rich solvent stream 520 thereby reducing the energy requirement of the stripping column 530. In embodiments, compressor 508 and turbine 510 form a turbocompressor. To capture one ton of $CO_2$ from the atmosphere, an approximate volume of 1.4 million cubic meters of air needs to be compressed. Such a process demands a substantial amount of energy. The configuration of high-pressure DAC system 500 allows for transferring the energy from the turbine to the compressor during decompression of the treated air which allows for recovery of most of the energy associated with compressing the incoming air stream. This efficiency is attributed to two main factors. Firstly, ambient air contains dilute concentration of $CO_2$ of about 0.04%, equivalent to one $CO_2$ molecule per 2,500 air molecules. Secondly, the absorption process and selection of solvent may selectively capture $CO_2$ along with minimal quantities of nitrogen and oxygen from the gas stream. As a result, over 99.9% of the air stream remains unaltered and available for recovery. This efficient separation and recovery process ensures that is the high-pressure DAC system is both energy-efficient and effective in its primary function of $CO_2$ capture.

Figure 6:
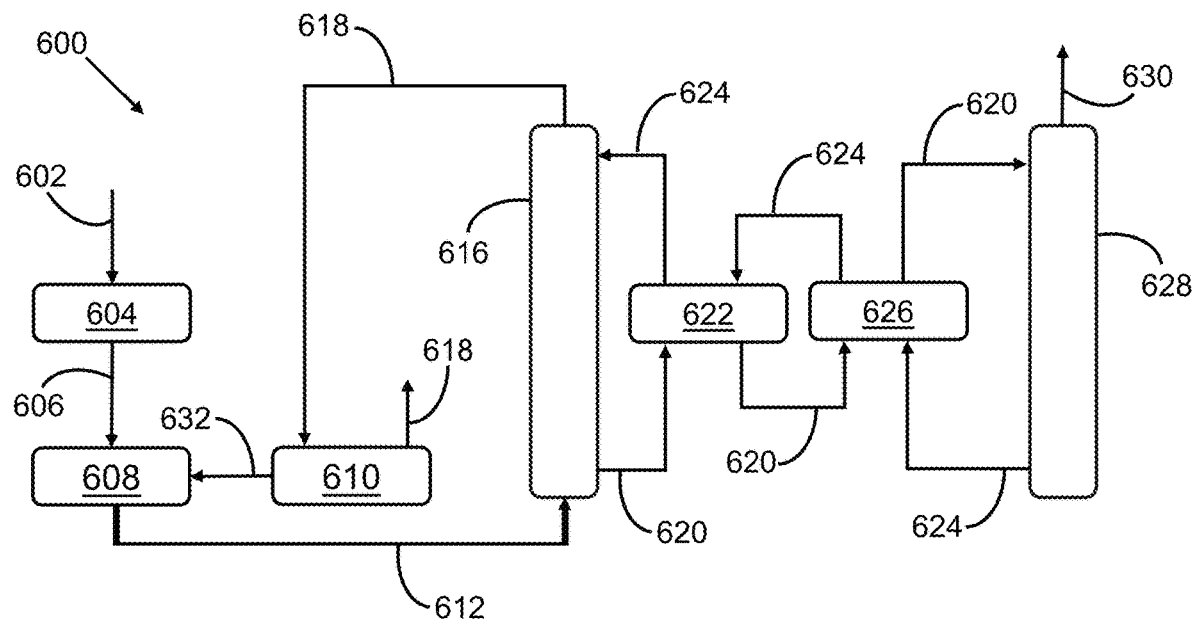
FIG. 6 illustrates an embodiment of a high-pressure DAC system comprising a heat exchanger, pressure exchanger, and turbocompressor in accordance with some embodiments of the present disclosure.

FIG. 6 illustrates another embodiment of a high-pressure DAC system 600. As shown in FIG. 6, atmospheric air stream 602 is introduced air intake filtration system 604. Air intake filtration system 604 can include an air intake filtration system as previously described. Cleaned air stream 606 is introduced into compressor 608 where the cleaned air stream is compressed to form compressed air stream 612 which is thereafter introduced into pressurized absorption column 616. In pressurized absorption column 616, lean solvent stream 624 is contacted with the air from compressed air stream 612 and at least a portion of the carbon dioxide in the air is absorbed into the lean solvent. Air stream 618 with reduced carbon content is withdrawn from pressurized absorption column 616 and introduced into turbine 610 where the kinetic energy of the air in air stream 618 is converted to mechanical power 632 to drive compressor 608. The air stream 618 now at a lower pressure, may be either purged from high-pressure DAC system 600 and/or utilized in a downstream process.

Rich solvent stream 620 containing the absorbed carbon dioxide is withdrawn from pressurized absorption column 616 and introduced into pressure exchanger 622. Optionally, rich solvent stream 620 is flashed to a lower pressure prior to being introduced into pressure exchanger 622. In pressure exchanger 622, the relatively lower pressure lean solvent stream 624 is pressurized by exchanging pressure energy from relatively higher pressure rich solvent stream 620. Pressure exchanger 622 may include any pressure exchangers as previously described. From pressure exchanger 622, the rich solvent stream 620 now at a lower pressure is introduced into heat exchanger 626. In heat exchanger 626, the relatively colder rich solvent stream 620 is thermally contacted with relatively warmer lean solvent stream 624 to raise the temperature of the rich solvent stream 620 before being withdrawn from heat exchanger 626 and introduced into stripping column 628. In stripping column 628, heat and optionally a stripping gas is utilized to strip the rich solvent of carbon dioxide to produce carbon rich stream 630 which may be sent for further processing and/or storage. Lean solvent stream 624 is withdrawn from stripping column 628 and introduced into heat exchanger 626 to heat rich solvent stream 620. The lean solvent stream 624 is withdrawn from heat exchanger 626 and introduced into pressure exchanger 622 to pressurize lean solvent stream 624.

Pressurized absorption column 616 operates at relatively higher pressure and relatively lower temperature than stripping column 628 which operates at a relatively lower pressure and relatively higher temperature. The addition of heat exchanger 626, pressure exchanger 622, turbine 610, and compressor 608 in high-pressure DAC system 600 allows for recovery and reuse pressure and thermal energy from all relevant streams within the process reducing the energy requirement of high-pressure DAC system 600.

Figure 7:
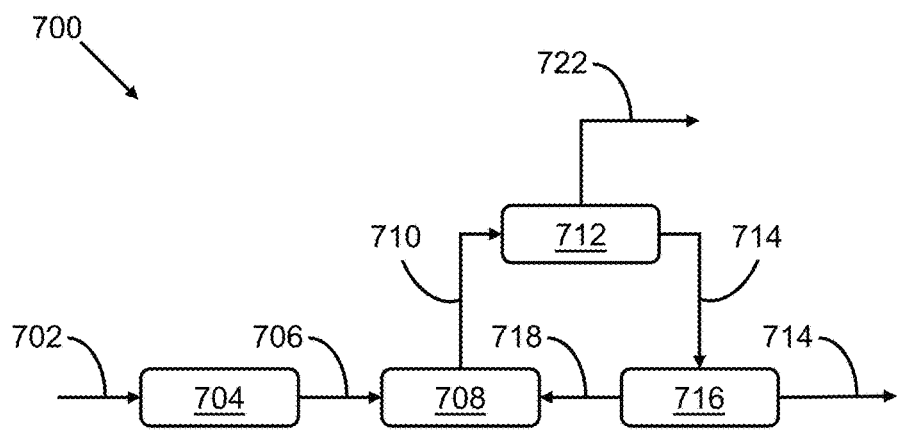
FIG. 7 illustrates an embodiment of a high-pressure DAC system comprising a membrane separator and turbocompressor in accordance with some embodiments of the present disclosure.

FIG. 7 illustrates another embodiment of a high-pressure DAC system 700. As shown in FIG. 7, atmospheric air stream 702 is introduced air intake filtration system 704. Air intake filtration system 704 can include an air intake filtration system as previously described. Cleaned air stream 706 is introduced into compressor 708 where the cleaned air stream is compressed to form compressed air stream 710 which is thereafter introduced into membrane separator 712. Membrane separator 712 includes a membrane which separates carbon dioxide from the incoming air stream. The membrane may include, without limitation, polymeric membranes such as those constructed from polyamides, polyimides, cellulose acetate, and/or polyetherimide, inorganic membranes including zeolites, silica, and/or carbon molecular sieves, mixed matrix membranes such as polymers with inorganic fillers such as zeolites and metal-organic frameworks as well as ionic liquid membranes which incorporate an ionic liquid with polymers for enhanced selectivity to carbon dioxide. Carbon rich stream 722 is withdrawn from membrane separator 712 and may be sent for further processing and/or storage. Air stream 714 with reduced carbon content is withdrawn from membrane separator 712 and introduced into turbine 716 where the kinetic energy of the air in air stream 714 is converted to mechanical power 718 to drive compressor 708. The air stream 714 now at a lower pressure, may be either purged from high-pressure DAC system 700 and/or utilized in a downstream process.

Figure 8:
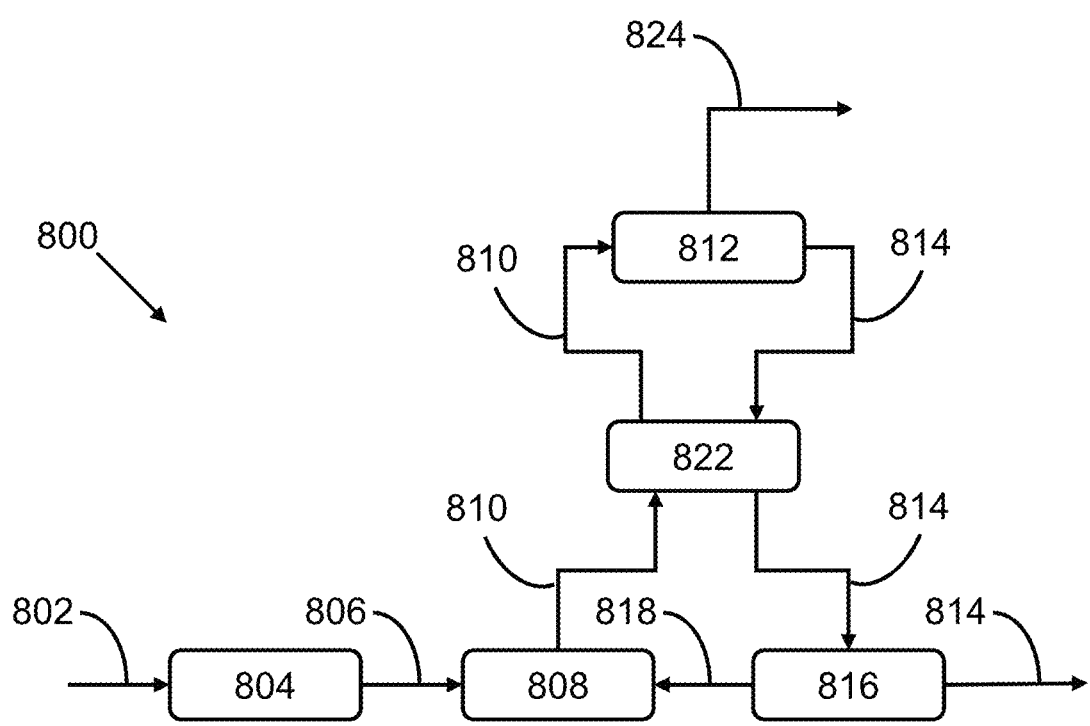
FIG. 8 illustrates an embodiment of a high-pressure DAC system comprising a membrane separator, heat exchanger, and turbocompressor in accordance with some embodiments of the present disclosure.

FIG. 8 illustrates another embodiment of a high-pressure DAC system 800. As shown in FIG. 8, atmospheric air stream 802 is introduced air intake filtration system 804. Air intake filtration system 804 can include an air intake filtration system as previously described. Cleaned air stream 806 is introduced into compressor 808 where the cleaned air stream is compressed to form compressed air stream 810 which is thereafter introduced into heat exchanger 822. In heat exchanger 822, the relatively hotter compressed air stream 810 is thermally contacted with air stream 814 to reduce the temperature of the compressed air stream 810 before being withdrawn from heat exchanger 822 and introduced into membrane separator 812. Membrane separator 812 includes a membrane which separates carbon dioxide from the incoming air stream. The membrane may include, without limitation, polymeric membranes such as those constructed from polyamides, polyimides, cellulose acetate, and/or polyetherimide, inorganic membranes including zeolites, silica, and/or carbon molecular sieves, mixed matrix membranes such as polymers with inorganic fillers such as zeolites and metal-organic frameworks as well as ionic liquid membranes which incorporate an ionic liquid with polymers for enhanced selectivity to carbon dioxide. Carbon rich stream 824 is withdrawn from membrane separator 812 and may be sent for further processing and/or storage. Air stream 814 with reduced carbon content is withdrawn from membrane separator 812 and introduced into heat exchanger 822 to be thermally contacted with compressed air stream 810. Air stream 814 is withdrawn from heat exchanger 822 and introduced into turbine 816 where the kinetic energy of the air in air stream 814 is converted to mechanical power 818 to drive compressor 808. The air stream 814 now at a lower pressure, may be either purged from high-pressure DAC system 800 and/or utilized in a downstream process.

Gas separation membranes demonstrate enhanced performance with increasing temperatures. Operating at high pressure and temperature can significantly improve $CO_2$ permeability compared to other gases in the air, thereby boosting separation efficiency. Achieving optimal performance under these conditions requires selecting membrane materials that can withstand elevated temperatures and pressures while maintaining efficient $CO_2$ separation. However, there may be an upper limit to the temperatures these membranes can operate. Higher temperatures also demand greater energy input for heating the air, which may increase operational costs. The heat exchanger 822 is utilized to recover and reuse heat effectively.

Operating Conditions

In embodiments, the compressor in the high-pressure DAC system pressurizes the incoming air stream to a pressure at a point in a range of 50 bar to 80 bar. Alternatively, to a pressure at a point in a range of 50 bar to 60 bar, 60 bar to 70 bar, 70 bar to 80 bar, or any ranges therebetween. Similarly, in embodiments the pressurized absorption column in the high-pressure DAC system operates at a pressure at a point in a range of 50 bar to 80 bar. Alternatively, a pressure at a point in a range of 50 bar to 60 bar, 60 bar to 70 bar, 70 bar to 80 bar, or any ranges therebetween. In embodiments, the pressurized absorption column operates at ambient temperature without additional heating or cooling input. For example, the pressurized absorption column is operated at a point in a range of 5° C. to 60° C. Alternatively, at a point in a range of from 5° C. to 15° C., 15° C. to 25° C., 25° C. to 35° C., 35° C. to 45° C., 45° C. to 60° C., or any ranges therebetween. In some embodiments, the pressurized absorption column is operated at a point in a range of 20° C. to 25° C.

In embodiments, the stripping column in the high-pressure DAC system operates at a pressure and temperature suitable to strip the carbon dioxide from the rich solvent. In embodiments, the stripping column in the high-pressure DAC system operates at a pressure below 70 bar. For example, a pressure below 60 bar, below 30 bar, or below 10 bar. In some embodiments, the stripping column operates at pressure at a point in a range of about 1 bar to about 3 bar. In embodiments, the stripping column operates a temperature at a point in a range of about 90° C. to about 140° C. Alternatively, the stripping column operates at a temperature at a point in a range of 90° C. to 95° C., 95° C. to 105° C., 105° C. to 115° C., 115° C. to 125° C., 125° C. to 135° C., 135° C. to 145° C., or any ranges therebetween.

In some embodiments, the membrane separator operates at pressures at a point in a range of 50 bar to 300 bar. Alternatively, at a point in a range of 50 bar to 70 bar, 70 bar to 100 bar, 100 bar to 200 bar, 200 bar to 300 bar, or any ranges therebetween.

Solvents

There are various suitable solvents that may be utilized in the high-pressure DAC system, each with their unique properties and applications. Chemical absorbents include substances like alkali metal hydroxides and carbonates, ammonia, amines, and ionic liquids, which chemically react with gases to facilitate absorption. On the other hand, physical absorbents such as dimethyl ethers of polyethylene glycol and/or methanol operate through physical interactions, absorbing gases without undergoing chemical reactions. In some embodiments, the solvent mixture used in the high-pressure DAC system may include ammonia ($NH_3$), sodium carbonate ($Na_2CO_3$), potassium carbonate ($K_2CO_3$), or some combination thereof. When combined these components may form a mixture of weak bases that have a medium sorption enthalpy and medium absorption rate. The absorption rate of carbon dioxide increases when operating at high pressure such as in the high-pressure DAC system. Weak bases are favorable for carbon capture applications. They generally require less energy to absorb and release $CO_2$, resulting in higher efficiency and reduced costs. For example, strong bases (e.g. KOH) require about twice the energy of weak bases (e.g. $K_2CO_3$) to release $CO_2$.

While weak bases excel due to their lower energy needs, they might not match strong bases in terms of absorption rate. Strong bases like sodium hydroxide or calcium hydroxide release huge amounts of hydroxide ions rapidly to remove any diffusion limitations. In contrast, weak bases maintain moderate pH levels (~9-10), which limit the amount of $CO_2$ that could be diffused. Strong bases absorb $CO_2$ well but the limitations associates with the use of strong bases may be mitigated by operating at high pressures and using a weak base solvent as described with respect to the presently disclosed high-pressure DAC system.

Amines have are widely used in acid gas treatment. However, amine degradation may limit the potential viability of strong bases being used in DAC applications. Strong bases can undergo oxidation in the presence of oxygen (21% in the air). The oxidation of amines involves the loss of electrons from the nitrogen atom, resulting in the formation of oxygen-containing compounds. When operating at high pressures, more oxygen will dissolve into the solvent which can amplify and speed up the degradation process. In contrast, ammonia lacks the presence of additional carbon-hydrogen (C—H) and carbon-carbon (C—C) bonds which mitigates the oxidation problems associated with higher order amine. Also, additional functional groups in amines make them more susceptible to oxidation.

While primary interaction of $CO_2$ with absorbent is important, secondary interaction of $CO_2$ at high pressure also plays a critical role in determining the capture efficiency. At pressures above 73 bar, $CO_2$ may transform into a supercritical fluid, which exhibits properties of both gas and liquid. As a result, the absorption rate of $CO_2$ into may slow down, impeding diffusion. When the temperature drops too low at these high pressures, $CO_2$ can react with water to form hydrates, which are ice-like structures that can trap $CO_2$ molecules within their lattice structure. This process hinders the capture process and slows down the absorption of $CO_2$ into the solvent.

Another secondary process parameter is solubility diagrams or solubility curves. Temperature and concentration are two important factors that affect solubility. Generally, as the temperature increases, the solubility of solids in liquids also increases, while the solubility of gases in liquids decreases. Concentration also plays a role in determining solubility. In some cases, increasing the concentration of the solute in the solvent can lead to precipitation of solids. The $CO_2$ capturing process will increase the amount of $CO_2$ dissolved at a specific temperature. This can be important in determining the right concentration of absorbent material.

The solvent used in the pressurized absorption column may include one or more of ammonia, potassium carbonate, and sodium carbonate. In further embodiments, the solvent includes water to form an aqueous solution. In embodiments, the composition of the solvent includes water and 2 moles to 10 moles of ammonia ($NH_3$) per liter of water. Alternatively, the solvent includes 2 moles to 10 moles of ammonia per liter of water, 2 moles to 4 moles of ammonia per liter of water, 4 moles to 6 moles of ammonia per liter of water, 6 moles to 10 moles of ammonia per liter of water, or any ranges therebetween. In embodiments, the solvent further includes 1 moles to 7 moles of potassium carbonate ($K_2CO_3$) per liter of water. Alternatively, the solvent includes 1 moles to 3 moles of potassium carbonate per liter of water, 4 moles to 5 moles of potassium carbonate per liter of water, 5 moles to 7 moles of potassium carbonate per liter of water, or any ranges therebetween. In embodiments, the solvent further includes 1 mole to 4 moles sodium carbonate ($Na_2CO_3$) per liter of water. Alternatively, the solvent includes 1 mole to 1.5 moles sodium carbonate per liter of water, 1.5 mole to 2 moles sodium carbonate per liter of water, 2 mole to 4 moles sodium carbonate per liter of water, or any ranges therebetween.

Properties of Streams

In embodiments, the atmospheric air stream includes a relatively dilute amount of carbon dioxide such as less than 1000 ppm carbon dioxide. While the foregoing embodiments have been described as including atmospheric air steams, the systems and methods described herein are also suitable for reducing carbon dioxide content of other gas streams. For example, the systems and methods disclosed herein are suitable for reducing carbon in gas streams including, but are not limited to, gas streams from chemical processes, industrial processes, medical processes, manufacturing processes, paper pulping processes, flue gasses, natural gas streams, or the like.

Some embodiments of the disclosed DAC system are specifically designed to operate at gigaton scale, which requires processing enormous volumes of air. The disclosed design addresses this challenge by processing more volume in less space. This design may reduce the necessary volume by a factor of 70 while simultaneously increasing absorption rates by over 700 times as compared to atmospheric DAC embodiments.

Embodiments disclosed herein include:

Embodiment 1. A high-pressure direct air capture (DAC) system for dilute carbon dioxide streams comprising: a compressor configured to compress an air stream comprising carbon dioxide to form a compressed air stream; and a gas separation system coupled to the compressed air stream, wherein the gas separation system is configured to remove at least a portion of the carbon dioxide from the compressed air stream to form a stream with reduced carbon content.

Embodiment 2. The high-pressure DAC system of embodiment 1 wherein the gas separation system comprises a contactor comprising a solvent and/or a gas membrane.

Embodiment 3. The high-pressure DAC system of any of embodiments 1-2 further comprising an intake filtration system fluidically coupled to an inlet of the compressor, wherein the intake filtration system is configured to remove impurities from the air stream before compressing the air stream.

Embodiment 4. The high-pressure DAC system of any of embodiments 1-3 wherein the gas separation system comprises a pressurized absorption column comprising a first inlet fluidically coupled to the compressed air stream and a second inlet fluidically coupled to a lean solvent stream, wherein the pressurized absorption column is configured to contact the compressed air stream with the lean solvent stream to absorb at least a portion of the carbon dioxide from the compressed air stream to generate a rich solvent stream comprising the absorbed carbon dioxide and an air stream with reduced carbon dioxide content.

Embodiment 5. The high-pressure DAC system of embodiment 4 further comprising a heat exchanger and a stripping column, wherein a first inlet of the heat exchanger is fluidically coupled to the rich solvent stream to convey the rich solvent stream to the heat exchanger, a second inlet of the heat exchanger is fluidically coupled to an outlet of the stripping column for conveying the lean solvent stream to the heat exchanger, a first outlet of the heat exchanger is fluidically coupled to the second inlet of the pressurized absorption column for conveying the lean solvent stream to the pressurized absorption column, and a second outlet of the heat exchanger is fluidically coupled to an inlet of the stripping column to convey the rich solvent stream to the stripping column, wherein the heat exchanger is configured to thermally contact the rich solvent stream with the lean solvent stream to transfer thermal energy from the lean solvent stream to the rich solvent stream, and wherein the stripping column is configured to remove at least a portion of carbon dioxide from the rich solvent stream to generate the lean solvent stream.

Embodiment 6. The high-pressure DAC system of any of embodiments 4-5 further comprising a pressure exchanger, a heat exchanger, and a stripping column, wherein a first inlet of the pressure exchanger is fluidically coupled to the rich solvent stream to convey the rich solvent stream to the pressure exchanger from the pressurized absorption column, a second inlet of the pressure exchanger is fluidically coupled to a first outlet of the heat exchanger for conveying the lean solvent stream to the pressure exchanger from the heat exchanger, a first outlet of the pressure exchanger is fluidically coupled to the second inlet of the pressurized absorption column to convey the lean solvent stream to the pressurized absorption column, a second outlet of the heat exchanger is fluidically coupled to an inlet of the stripping column to convey the rich solvent stream to the stripping column, wherein the pressure exchanger is configured to transfer pressure energy from the rich solvent stream to the lean solvent stream, wherein the heat exchanger is configured to thermally contact the rich solvent stream with the lean solvent stream to transfer thermal energy from the lean solvent stream to the rich solvent stream, and wherein the stripping column is configured to remove at least a portion of carbon dioxide from the rich solvent stream to generate the lean solvent stream.

Embodiment 7. The high-pressure DAC system of any of embodiments 4-6 further comprising a heat exchanger, a turbine, and a stripping column, wherein a first inlet of the heat exchanger is fluidically coupled to the rich solvent stream to convey the rich solvent stream to the heat exchanger, a second inlet of the heat exchanger is fluidically coupled to an outlet of the stripping column for conveying the lean solvent stream to the heat exchanger, a first outlet of the heat exchanger is fluidically coupled to the second inlet of the pressurized absorption column for conveying the lean solvent stream to the pressurized absorption column, and a second outlet of the heat exchanger is fluidically coupled to an inlet of the stripping column to convey the rich solvent stream to the stripping column, wherein the heat exchanger is configured to thermally contact the rich solvent stream with the lean solvent stream to transfer thermal energy from the lean solvent stream to the rich solvent stream, wherein the stripping column is configured to remove at least a portion of carbon dioxide from the rich solvent stream to generate the lean solvent stream, wherein the turbine is fluidically coupled to the air stream with reduced carbon dioxide content, and wherein the turbine is configured to recover energy from the air stream with reduced carbon dioxide to at least partially power the compressor.

Embodiment 8. The high-pressure DAC system of any of embodiments 4-7 further comprising a pressure exchanger, a heat exchanger, a turbine, and a stripping column, wherein a first inlet of the pressure exchanger is fluidically coupled to the rich solvent stream to convey the rich solvent stream to the pressure exchanger from the pressurized absorption column, a second inlet of the pressure exchanger is fluidically coupled to a first outlet of the heat exchanger for conveying the lean solvent stream to the pressure exchanger from the heat exchanger, a first outlet of the pressure exchanger is fluidically coupled to the second inlet of the pressurized absorption column to convey the lean solvent stream to the pressurized absorption column, a second outlet of the heat exchanger is fluidically coupled to an inlet of the stripping column to convey the rich solvent stream to the stripping column, wherein the pressure exchanger is configured to transfer pressure energy from the rich solvent stream to the lean solvent stream, wherein the heat exchanger is configured to thermally contact the rich solvent stream with the lean solvent stream to transfer thermal energy from the lean solvent stream to the rich solvent stream, wherein the stripping column is configured to remove at least a portion of carbon dioxide from the rich solvent stream to generate the lean solvent stream, wherein the turbine is fluidically coupled to the air stream with reduced carbon dioxide content, and wherein the turbine is configured to recover energy from the air stream with reduced carbon dioxide to at least partially power the compressor.

Embodiment 9. The high-pressure DAC system of embodiment 1 further comprising a turbine, wherein the gas separation system comprises a membrane separator comprising an inlet fluidically coupled to the compressed air stream and, wherein the membrane separator is configured to separate at least a portion of the carbon dioxide from the compressed air stream to generate a carbon dioxide rich stream and an air stream with reduced carbon dioxide content, and wherein the turbine is configured to recover energy from the air stream with reduced carbon dioxide to at least partially power the compressor.

Embodiment 10. The high-pressure DAC system of embodiment 9 further comprising a heat exchanger, wherein a first inlet of the heat exchanger is fluidically coupled to the compressed air stream for conveying the compressed air stream to the heat exchanger, a second inlet of the heat exchanger is fluidically coupled to an outlet of the membrane separator for conveying the air stream with reduced carbon dioxide content to the heat exchanger, a first outlet of the heat exchanger is fluidically coupled to an inlet of the membrane separator for conveying the compressed air stream to the membrane separator, and a second outlet of the heat exchanger is fluidically coupled to an inlet of the turbine to convey the air stream with reduced carbon dioxide content to the turbine, and wherein the heat exchanger is configured is configured to thermally contact the compressed air stream with the air stream with reduced carbon dioxide content to transfer thermal energy from the compressed air stream to the air stream with reduced carbon dioxide content.

Embodiment 11. A method for high-pressure direct air capture (DAC) of dilute carbon dioxide streams comprising: compressing an air stream comprising carbon dioxide using a compressor to form a compressed air stream; and introducing the compressed air stream into a gas separation system and removing at least a portion the carbon dioxide from the compressed air stream in the gas separation system to form a stream with reduced carbon content.

Embodiment 12. The method of embodiment 11 further comprising introducing the air stream into an intake filtration system, wherein the intake filtration system is configured to remove impurities from the air stream before compressing the air stream.

Embodiment 13. The method of any of embodiments 11-12 wherein the gas separation system comprises a pressurized absorption column and wherein the method further comprises: contacting the compressed air stream with a lean solvent stream in the pressurized absorption column to absorb the portion of the carbon dioxide to form the stream with reduced carbon content and a rich solvent stream comprising the portion of the carbon dioxide; and introducing the rich solvent stream into a stripping column and removing at least a portion of the carbon dioxide in the stripping column from the rich solvent stream to form the lean solvent stream.

Embodiment 14. The method of embodiment 13 wherein the lean solvent stream comprises water and about 4 moles to about 6 moles of ammonia per liter of water, about 3 moles to about 5 moles of potassium carbonate per liter of water, and about 1 mole to about 3 moles of sodium carbonate per liter of water.

Embodiment 15. The method of any of embodiments 13-14 wherein the pressurized absorption column is operated at a pressure at a point in a range of about 50 bar to about 80 bar and a temperature at a point in a range of about 5° C. to about 60° C.

Embodiment 16. The method of any of embodiments 13-15 wherein the stripping column is operated a pressure at a point in an range of about 1 bar to about 3 bar and a temperature at a point in a range of about 90° C. to about 140° C.

Embodiment 17. The method of any of embodiments 13-16 further comprising introducing the rich solvent stream from the pressurized absorption column and the lean solvent stream from the stripping column into a heat exchanger and thermally contacting the rich solvent stream and the lean solvent stream to heat the rich solvent stream.

Embodiment 18. The method of any of embodiments 13-17 further comprising: introducing into a pressure exchanger the rich solvent stream from the pressurized absorption column and a lean solvent stream from a heat exchanger, pressurizing the lean solvent stream from the heat exchanger to form a pressurized lean solvent and introducing the pressurized lean solvent into the pressurized absorption column; and introducing the rich solvent stream from the pressure exchanger and the lean solvent stream from the stripping column into the heat exchanger and thermally contacting the rich solvent stream from the pressure exchanger and the lean solvent stream to heat rich solvent stream from the pressure exchanger.

Embodiment 19. The method of embodiment 11 further comprising introducing the stream with reduced carbon content into a turbine and generating energy to at least partially power the compressor.

Embodiment 20. The method embodiment 19 wherein the gas separation system comprises a membrane separator wherein the method further comprises: contacting the compressed air stream with the membrane separator to separate the portion of the carbon dioxide to form the stream with reduced carbon content and a carbon dioxide rich stream.

Embodiment 21. The method of embodiment 20 further comprising introducing the stream with reduced carbon content into a turbine and generating energy to at least partially power the compressor.

Embodiment 22. The method of any of embodiments 19-20 further comprising: thermally contacting the compressed air stream and the stream with reduced carbon content in a heat exchanger to transfer thermal energy from the compressed air stream to the air stream with reduced carbon dioxide content.

Embodiment 23. The method of any of embodiments 19-21 wherein the membrane separator operates at a pressure at a point in a range of about 50 bar to about 300 bar, and at a temperature at a point in a range of about ambient temperature to about 150° C.

Embodiment 24. A method for separating carbon dioxide comprising: compressing a stream comprising carbon dioxide using a compressor to form a compressed stream; contacting the compressed stream with a lean solvent stream in a pressurized absorption column to absorb a portion of the carbon dioxide to form a stream with reduced carbon content and a rich solvent stream comprising the portion of the carbon dioxide, wherein the pressurized absorption column is operated at a pressure at a point in a range of about 10 bar to about 50 bar and a temperature at a point in a range of about 5° C. to about 60° C. and wherein lean solvent stream comprises water and about 4 moles to about 6 moles of ammonia per liter of water, about 3 mole to about 5 moles of potassium carbonate per liter of water, and about 1 mole to about 3 moles of sodium carbonate per liter of water; introducing into a pressure exchanger the rich solvent stream from the pressurized absorption column and a lean solvent stream from a heat exchanger, pressurizing the lean solvent stream from the heat exchanger and introducing the pressurized lean solvent into the pressurized absorption column; introducing the rich solvent stream from the pressure exchanger and a lean solvent stream from a stripping column into the heat exchanger and thermally contacting the rich solvent stream from the pressure exchanger and the lean solvent stream from the stripping column to heat rich solvent stream from the pressure exchanger; introducing the rich solvent stream from the heat exchanger into a stripping column and removing at least a portion of the carbon dioxide in the stripping column from the rich solvent stream to form the lean solvent stream, wherein the stripping column is operated a pressure at a point in an range of about 1 bar to about 3 bar and a temperature at a point in a range of about 90° C. to about 140° C.; and introducing the stream with reduced carbon content into a turbine and generating energy to at least partially power the compressor.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A high-pressure system for capturing dilute carbon dioxide directly from the atmosphere comprising:
    an intake filtration system configured to receive an incoming atmospheric air stream and to remove impurities foreign to a compressor from the incoming atmospheric air stream, wherein the intake filtration system comprises housing defining an airflow path that comprises at least one feature selected from the group consisting of a weather hood, a screen air filter a high-efficiency particulate air (HEPA) filter, a drift eliminator, a plenum, ducting, baffles, and combinations thereof;
    the compressor having an inlet fluidically coupled to an outlet of the intake filtration system, wherein the compressor is configured to compress the atmospheric air stream comprising carbon dioxide to form a compressed atmospheric air stream having a volume reduction of at least 50% as compared to the incoming atmospheric air stream to achieve a downstream gas separation system with a volumetric capacity smaller compared to a downstream gas separation unit without said volume reduction, and wherein the compressor has a rated capacity of at least one billion cubic meters of the atmospheric air stream annually; and the gas separation system coupled to the compressed atmospheric air stream, wherein the gas separation system is configured to remove at least a portion of the carbon dioxide from the compressed atmospheric air stream to form a stream with reduced carbon content.

2. The high-pressure system of claim 1 wherein the gas separation system comprises a contactor comprising a solvent and/or a gas membrane.

3. The high-pressure system of claim 1 wherein the compressor comprises an axial compressor.

4. The high-pressure system of claim 3 wherein the gas separation system comprises a pressurized absorption column comprising a first inlet fluidically coupled to the compressed atmospheric air stream and a second inlet fluidically coupled to a lean solvent stream, wherein the pressurized absorption column is configured to contact the compressed atmospheric air stream with the lean solvent stream to absorb at least a portion of the carbon dioxide from the compressed atmospheric air stream to generate a rich solvent stream comprising the portion of the carbon dioxide and an air stream with reduced carbon dioxide content.

5. The high-pressure system of claim 4 further comprising a heat exchanger and a stripping column,
   wherein a first inlet of the heat exchanger is fluidically coupled to the rich solvent stream to convey the rich solvent stream to the heat exchanger,
      a second inlet of the heat exchanger is fluidically coupled to an outlet of the stripping column for conveying the lean solvent stream to the heat exchanger,
      a first outlet of the heat exchanger is fluidically coupled to the second inlet of the pressurized absorption column for conveying the lean solvent stream to the pressurized absorption column, and
      a second outlet of the heat exchanger is fluidically coupled to an inlet of the stripping column to convey the rich solvent stream to the stripping column,
   wherein the heat exchanger is configured to thermally contact the rich solvent stream with the lean solvent stream to transfer thermal energy from the lean solvent stream to the rich solvent stream, and
   wherein the stripping column is configured to remove at least a portion of carbon dioxide from the rich solvent stream to generate the lean solvent stream.

6. The high-pressure system of claim 4 further comprising a pressure exchanger, a heat exchanger, and a stripping column,
   wherein a first inlet of the pressure exchanger is fluidically coupled to the rich solvent stream to convey the rich solvent stream to the pressure exchanger from the pressurized absorption column,
      a second inlet of the pressure exchanger is fluidically coupled to a first outlet of the heat exchanger for conveying the lean solvent stream to the pressure exchanger from the heat exchanger,
      a first outlet of the pressure exchanger is fluidically coupled to the second inlet of the pressurized absorption column to convey the lean solvent stream to the pressurized absorption column,
      a second outlet of the heat exchanger is fluidically coupled to an inlet of the stripping column to convey the rich solvent stream to the stripping column,
   wherein the pressure exchanger is configured to transfer pressure energy from the rich solvent stream to the lean solvent stream,
   wherein the heat exchanger is configured to thermally contact the rich solvent stream with the lean solvent stream to transfer thermal energy from the lean solvent stream to the rich solvent stream, and
   wherein the stripping column is configured to remove at least a portion of carbon dioxide from the rich solvent stream to generate the lean solvent stream.

7. The high-pressure system of claim 4 further comprising a heat exchanger, an axial turbine, and a stripping column,
   wherein a first inlet of the heat exchanger is fluidically coupled to the rich solvent stream to convey the rich solvent stream to the heat exchanger,
      a second inlet of the heat exchanger is fluidically coupled to an outlet of the stripping column for conveying the lean solvent stream to the heat exchanger,
      a first outlet of the heat exchanger is fluidically coupled to the second inlet of the pressurized absorption column for conveying the lean solvent stream to the pressurized absorption column, and
      a second outlet of the heat exchanger is fluidically coupled to an inlet of the stripping column to convey the rich solvent stream to the stripping column,
   wherein the heat exchanger is configured to thermally contact the rich solvent stream with the lean solvent stream to transfer thermal energy from the lean solvent stream to the rich solvent stream,
   wherein the stripping column is configured to remove at least a portion of carbon dioxide from the rich solvent stream to generate the lean solvent stream,
   wherein the axial turbine is fluidically coupled to the air stream with reduced carbon dioxide content, and
   wherein the axial turbine is configured to recover energy from the air stream with reduced carbon dioxide to at least partially power the axial compressor.

8. The high-pressure system of claim 4 further comprising a pressure exchanger, a heat exchanger, an axial turbine, and a stripping column,
   wherein a first inlet of the pressure exchanger is fluidically coupled to the rich solvent stream to convey the rich solvent stream to the pressure exchanger from the pressurized absorption column,
      a second inlet of the pressure exchanger is fluidically coupled to a first outlet of the heat exchanger for conveying the lean solvent stream to the pressure exchanger from the heat exchanger,
      a first outlet of the pressure exchanger is fluidically coupled to the second inlet of the pressurized absorption column to convey the lean solvent stream to the pressurized absorption column,
      a second outlet of the heat exchanger is fluidically coupled to an inlet of the stripping column to convey the rich solvent stream to the stripping column,
   wherein the pressure exchanger is configured to transfer pressure energy from the rich solvent stream to the lean solvent stream,
   wherein the heat exchanger is configured to thermally contact the rich solvent stream with the lean solvent stream to transfer thermal energy from the lean solvent stream to the rich solvent stream, wherein the stripping column is configured to remove at least a portion of carbon dioxide from the rich solvent stream to generate the lean solvent stream, wherein the axial turbine is fluidically coupled to the air stream with reduced carbon dioxide content, and wherein the axial turbine is configured to recover energy from the air stream with reduced carbon dioxide to at least partially power the axial compressor.

9. The high-pressure system of claim 3 further comprising an axial turbine, wherein the gas separation system comprises a membrane separator comprising an inlet fluidically coupled to the compressed atmospheric air stream and, wherein the membrane separator is configured to separate at least a portion of the carbon dioxide from the compressed atmospheric air stream to generate a carbon dioxide rich stream and an air stream with reduced carbon dioxide content, and wherein the axial turbine is configured to recover energy from the air stream with reduced carbon dioxide to at least partially power the compressor.

10. The high-pressure system of claim 9 further comprising a heat exchanger, wherein a first inlet of the heat exchanger is fluidically coupled to the compressed atmospheric air stream for conveying the compressed atmospheric air stream to the heat exchanger, a second inlet of the heat exchanger is fluidically coupled to an outlet of the membrane separator for conveying the air stream with reduced carbon dioxide content to the heat exchanger, a first outlet of the heat exchanger is fluidically coupled to an inlet of the membrane separator for conveying the compressed atmospheric air stream to the membrane separator, and a second outlet of the heat exchanger is fluidically coupled to an inlet of the axial turbine to convey the air stream with reduced carbon dioxide content to the axial turbine, and wherein the heat exchanger is configured is configured to thermally contact the compressed atmospheric air stream with the air stream with reduced carbon dioxide content to transfer thermal energy from the compressed atmospheric air stream to the air stream with reduced carbon dioxide content.

11. A high-pressure system for capturing dilute carbon dioxide directly from the atmosphere comprising:

a turbocompressor comprising an axial compressor and an axial turbine;

a pressurized absorption column;

a pressure exchanger;

a heat exchanger;

a stripping column;

an intake filtration system fluidically coupled to an inlet of the turbocompressor, and an atmospheric air stream fluidically coupled to an inlet of the intake filtration system;

wherein the intake filtration system comprises a housing defining an airflow path that comprises a filter configured to filter the atmospheric air stream from impurities foreign to the turbocompressor, a drift eliminator configured to remove water droplets from the atmospheric air stream, a plenum and ducting configured to reduce turbulence in the atmospheric air stream, and baffles configured as an air silencer;

wherein the axial compressor is configured to reduce the volume of incoming air by at least 98% so as to reduce a volumetric capacity of the pressurized absorption column compared to a pressurized absorption column without said volume reduction, and to compress the atmospheric air stream comprising carbon dioxide to form a compressed atmospheric air stream, wherein a first inlet of the pressurized absorption column is fluidically coupled to the compressed atmospheric air stream and a second inlet of the pressurized absorption column is fluidically coupled to a lean solvent stream, wherein the pressurized absorption column is configured to contact the compressed atmospheric air stream with the lean solvent stream to absorb at least a portion of the carbon dioxide from the compressed atmospheric air stream to generate a rich solvent stream comprising the absorbed carbon dioxide and an air stream with reduced carbon dioxide content, wherein a first inlet of the pressure exchanger is fluidically coupled to the rich solvent stream to convey the rich solvent stream to the pressure exchanger from the pressurized absorption column and a second inlet of the pressure exchanger is fluidically coupled to a first outlet of the heat exchanger for conveying the lean solvent stream to the pressure exchanger from the heat exchanger, wherein a first outlet of the pressure exchanger is fluidically coupled to the second inlet of the pressurized absorption column to convey the lean solvent stream to the pressurized absorption column and a second outlet of the heat exchanger is fluidically coupled to an inlet of the stripping column to convey the rich solvent stream to the stripping column, wherein the pressure exchanger is configured to transfer pressure energy from the rich solvent stream to the lean solvent stream, wherein the heat exchanger is configured to thermally contact the rich solvent stream with the lean solvent stream to transfer thermal energy from the lean solvent stream to the rich solvent stream, wherein the stripping column is configured to remove at least a portion of carbon dioxide from the rich solvent stream to generate the lean solvent stream, wherein the axial turbine is fluidically coupled to the air stream with reduced carbon dioxide content, and wherein the axial turbine is configured to recover energy from the air stream with reduced carbon dioxide to at least partially power the axial compressor.

12. The high-pressure system of claim 1, wherein the compressor is configured to compress the atmospheric air stream to a pressure at a point in a range of 50 bar to 80 bar.

13. The high-pressure system of claim 11, wherein the compressor is configured to compress the atmospheric air stream to a pressure at a point in a range of 50 bar to 80 bar.

* * * * *